(12) United States Patent
Roswech et al.

(10) Patent No.: US 7,903,388 B2
(45) Date of Patent: *Mar. 8, 2011

(54) ELECTRICAL ISOLATOR FOR CAPACITIVE DEVICE

(75) Inventors: Todd Michael Roswech, Ithaca, NY (US); Todd P. St. Clair, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 484 days.

This patent is subject to a terminal disclaimer.

(21) Appl. No.: 11/947,141

(22) Filed: Nov. 29, 2007

(65) Prior Publication Data

US 2009/0141428 A1   Jun. 4, 2009

(51) Int. Cl.
*H01G 9/00*   (2006.01)
(52) U.S. Cl. ........................................ 361/502; 361/503
(58) Field of Classification Search .......... 361/502–503, 361/303
See application file for complete search history.

(56) References Cited

U.S. PATENT DOCUMENTS

| 3,859,195 | A | 1/1975 | Williams ...................... 204/272 |
| 5,415,768 | A | 5/1995 | Andelman ................. 210/198.2 |
| 5,954,937 | A | 9/1999 | Farmer ............................. 1/461 |
| 6,214,204 | B1* | 4/2001 | Gadkaree et al. ............. 205/758 |
| 6,661,643 | B2 | 12/2003 | Shiue et al. |
| 6,778,378 | B1 | 8/2004 | Andelman .......................... 4/35 |
| 7,147,785 | B2 | 12/2006 | Arba et al. ........................ 1/469 |
| 7,706,128 | B2* | 4/2010 | Bourcier ....................... 361/502 |
| 2001/0028546 | A1* | 10/2001 | Kasahara et al. ............. 361/512 |
| 2005/0079409 | A1* | 4/2005 | Andelman et al. .............. 429/94 |

FOREIGN PATENT DOCUMENTS

JP   06338437 A  * 12/1994
WO   2004/089832   10/2004

* cited by examiner

*Primary Examiner* — Eric Thomas
(74) *Attorney, Agent, or Firm* — Tina N. Thompson

(57) ABSTRACT

Capacitive devices are described having electrical isolators for electrodes which possess efficient electrical contact between current collectors, electrical isolation of electrodes, and/or electrochemical stability, while minimizing the mechanical stress and strain applied to the electrodes. The capacitive devices are adaptable to a wide range of electrode diameters and electrode stack lengths.

15 Claims, 4 Drawing Sheets

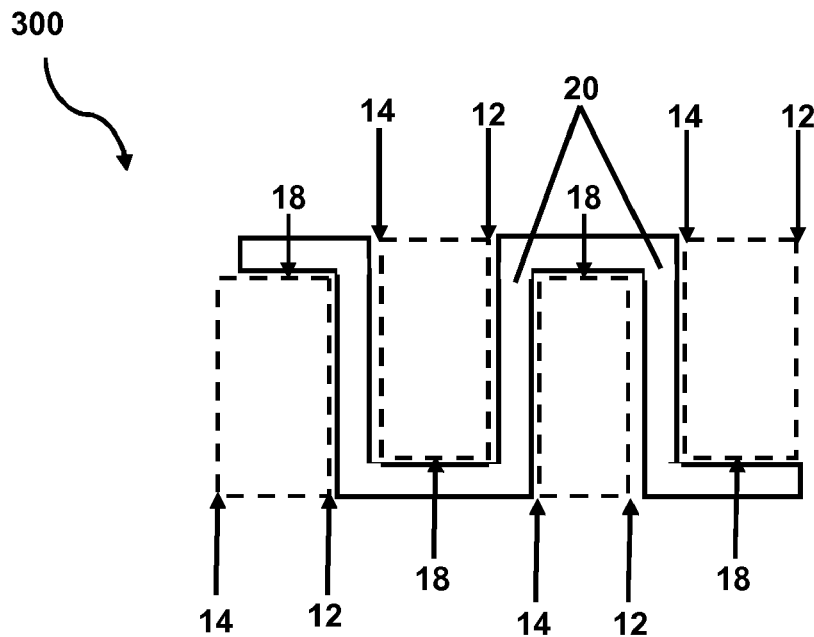
Figure 3
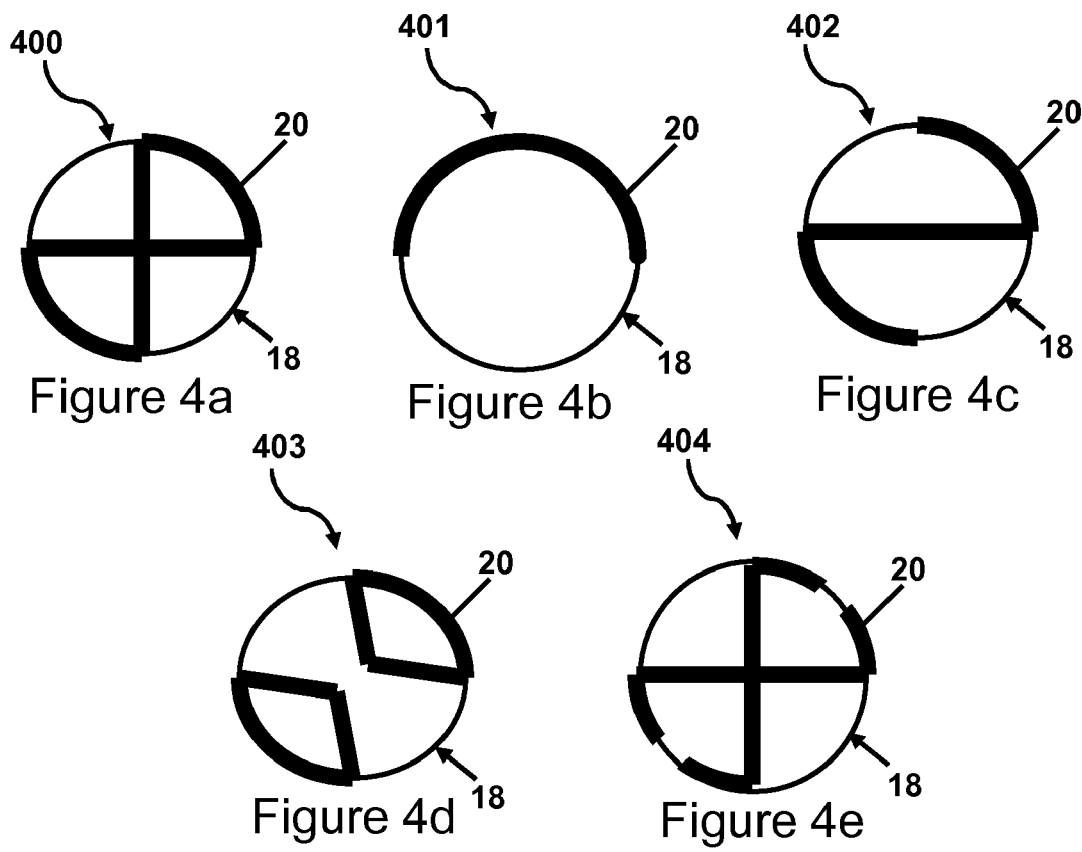
Figure 4a  Figure 4b  Figure 4c
Figure 4d  Figure 4e

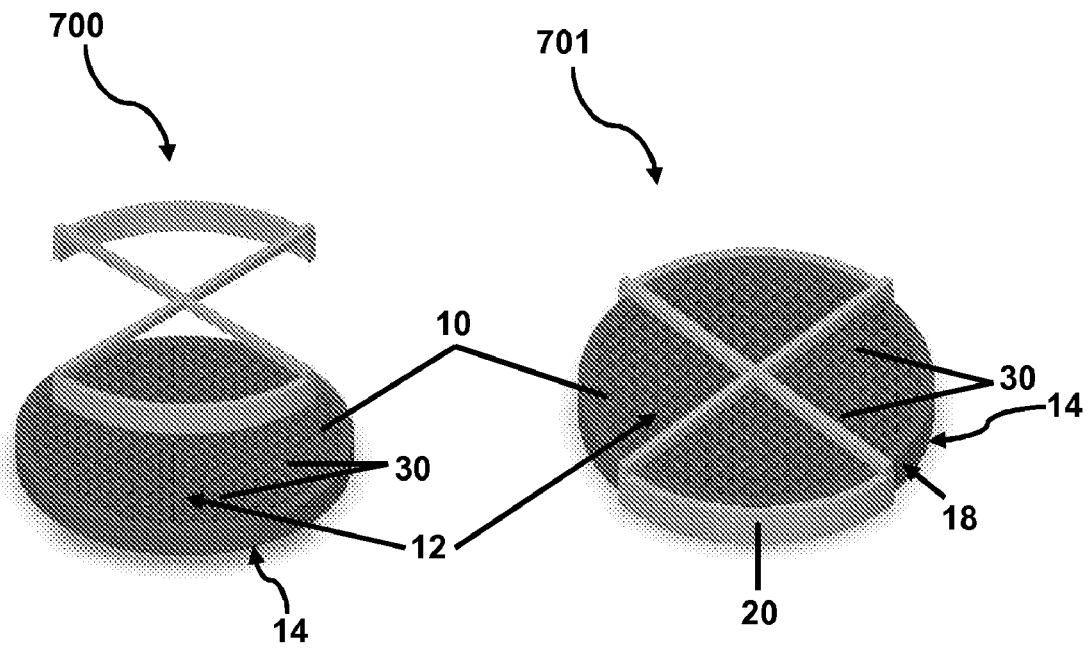
Figure 7a
Figure 7b
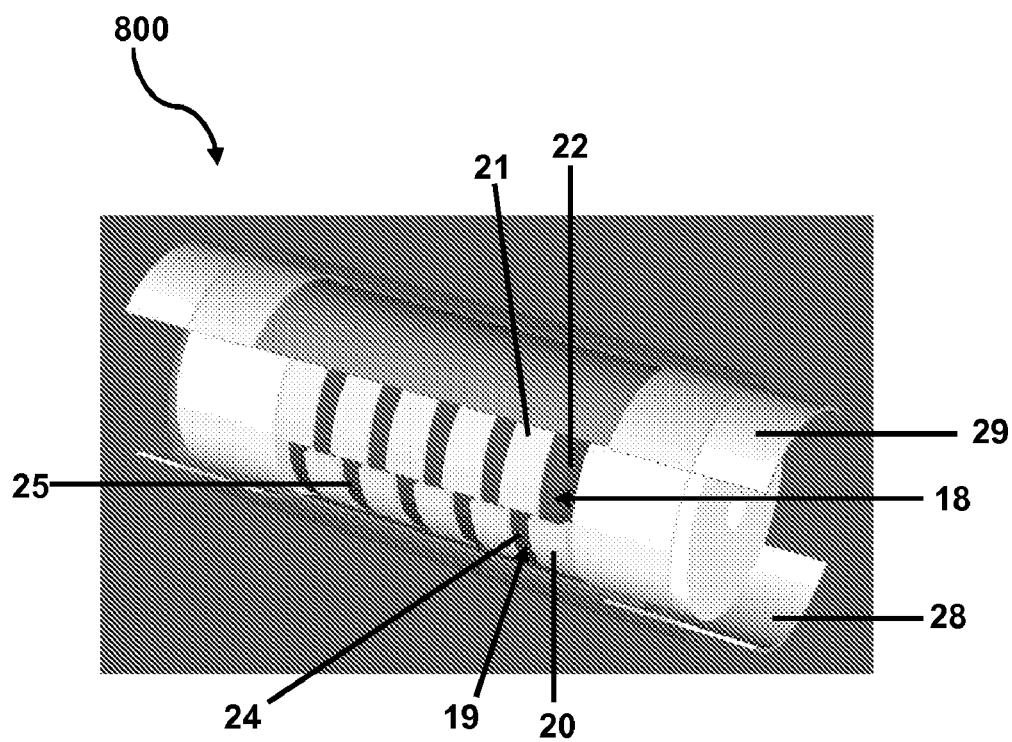
Figure 8

ELECTRICAL ISOLATOR FOR CAPACITIVE DEVICE

BACKGROUND

1. Field of the Invention

The present invention relates generally to an electrical isolator and more particularly to an electrical isolator for electrodes in a capacitive device useful for electric double layer capacitors and/or for capacitive deionization.

2. Technical Background

Capacitors, like batteries, store energy in the electrical field between a pair of oppositely charged conductive plates. Developed more than 250 years ago, capacitors are frequently used in electrical circuits as energy storage devices. In recent years, new families of capacitive devices have been developed which are based on charge separation of ions in solution and the formation of electrical double layers.

An electric double layer capacitor (EDLC) is an example of a capacitor that typically contains porous carbon electrodes (separated via a porous separator), current collectors and an electrolyte solution. When electric potential is applied to an EDLC cell, ionic current flows due to the attraction of anions to the positive electrode and cations to the negative electrode. Electric charge is stored in the electric double layer (EDL) formed along the interface between each polarized electrode and the electrolyte solution.

EDLC designs vary depending on application and can include, for example, standard jelly roll designs, prismatic designs, honeycomb designs, hybrid designs or other designs known in the art. The energy density and the specific power of an EDLC can be affected by the properties thereof, including the electrode and the electrolyte utilized. With respect to the electrode, high surface area carbons, carbon nanotubes, activated carbon and other forms of carbon and composites have been utilized in manufacturing such devices. Of these, carbon based electrodes are used in commercially available devices.

Capacitive Deionization (CDI) is a promising deionization technology, for instance, for the purification of water. In this context, alternating positively and negatively charged electrodes are used to attract ions from a stream or bath of fluid. The ions form electric double layers on the surfaces of the electrodes, which are fabricated from some form of high surface area material, for example, a form of activated carbon. After interaction with the electrodes during the charging period, the fluid contains a lower overall ion content and is discharged. A volume of purge fluid is then introduced to the electrodes. The electrodes are then electrically discharged, thus releasing the trapped ions into the purge fluid. The purge fluid is then diverted into a waste stream and the process repeated.

Physically spacing electrodes from adjacent electrodes while electrically isolating those electrodes from current collectors in a stack configuration is a challenging aspect for EDLC and CDI applications. Discrete insulators and spacers are typically needed to electrically isolate the electrodes. Further, electrodes are delicate, thus mechanical stressing and straining of the electrodes should be minimized. Minimizing the deformations applied to the electrodes is difficult, especially while attempting to maximize the electrical and mechanical integrity of an electrical interconnect to the electrodes.

Another challenging aspect is providing a robust mechanical package. The porous, permeable nature of the electrodes makes it difficult to isolate any electrical connection from the fluid being deionized. For this reason, the materials to be considered for use should survive a fairly harsh electrochemical corrosion environment, while providing adequate electrical conductivity and contact resistance with the electrodes.

U.S. Pat. No. 5,954,937 relates to an interconnection for resorcinol/formaldehyde carbon aerogel/carbon paper sheet electrodes. The fluid flow path is located between the surfaces of the electrode sheets. The electrodes are physically spaced, and the space provides the fluid flow path. The active surfaces of these electrode sheets are delicate and should be protected from mechanical stressing. The electrode sheets are bonded to a current collector, in this case, a titanium sheet using a conductive carbon filled adhesive. The large area of contact between the electrode sheet and the current collector insures relatively low overall resistance despite the moderately high resistivity of the adhesive interface.

U.S. Pat. No. 6,778,378 relates to electrodes which may be rolled from carbon and fibrillated polytetrafluoroethylene (PTFE). Electrodes formed in this fashion are thin flexible sheets which can be contacted by high normal compressive forces. Electrodes may be stacked up with sheets of current collector material and a separator material and then clamped with a compressive force to obtain good electrical contact. By controlling which electrodes and current collectors are in physical contact, a capacitive cell may be formed.

A flow-through (rather than parallel plate) flow geometry is described in commonly owned U.S. Pat. No. 6,214,204. In this reference, monolithic, low back pressure porous electrodes are made by one of several methods, which include honeycomb extrusion, casting or molding from a phenolic resin-based batch. After curing, these parts are carbonized and activated to create high surface area carbon monoliths with good electrical conductivity. Discs are made and assembled in a stack and spaced such that the discs are electrically isolated from each other. The discs are connected to anode and cathode current collector/bus bar assemblies utilizing wires.

U.S. Pat. No. 6,661,643 relates to the use of ionically-conductive spacers to separate adjacent electrodes in a CDI module and relates to the use of the CDI modules to deionize liquids. The CDI module provides simultaneous deionization and regeneration along with energy recovery. The spacers are in the form of a web or mesh and are interposed between electrodes. However, electrical interconnection must be accomplished on an electrode-by-electrode basis and as such is a major challenge to providing robust CDI modules.

U.S. Pat. No. 7,147,785 relates to the use of an electro-deionization device for water purification. Spacers are described which define depletion and concentration volumes and provide electrical insulation. As such, the spacers must function as water-tight seals to adequately separate liquid volumes and furthermore for high temperature applications must be dimensionally stable.

It would be advantageous to have a capacitive device comprising an electrical interconnect to a linear stack of electrodes, which does not jeopardize the mechanical integrity of the electrodes. Also, it would be advantageous to have the electrical interconnect be electrochemically inert. Further, it would be advantageous to develop a capacitive device, comprising interconnected monolithic high surface area carbon electrodes, which is capable of non-impeded fluid flow through the electrodes, which is useful for, for example, CDI.

It would be advantageous to have a capacitive device comprising an electrical isolator for a linear stack of electrodes, which does not jeopardize the mechanical integrity of the electrodes. It would be advantageous to have the electrical isolator provide an electrical insulating function for the electrode/current collector interface and also an electrical spacing function for adjacent electrodes. Also, it would be advantageous to have the electrical isolator be electrochemically inert. Further, it would be advantageous to develop a capacitive device utilizing such electrical isolators and comprising interconnected monolithic high surface area carbon electrodes, which is capable of non-impeded fluid flow through the electrodes, which is useful for, for example, CDI.

SUMMARY

Capacitive devices and features thereof, as described herein, address one or more of the above-mentioned disadvantages of conventional capacitive devices and/or electrical insulators/spacers and provide one or more of the following advantages: efficient electrical contact between current collectors, electrical isolation of electrodes, and electrochemical stability, while minimizing the mechanical stress and strain applied to the electrodes. The capacitive devices and features of the present invention are adaptable to a wide range of electrode diameters and electrode stack lengths.

One embodiment of the invention is a capacitive device comprising two or more electrodes arranged in series. Each electrode comprises a first face, an opposing second face and a thickness defined by an outer surface extending from the first face to the opposing second face. An electrical isolator comprising a compliant material is disposed between faces of adjacent electrodes and covers at least a portion of the outer surface of the first electrode.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

FIG. 3 is a schematic of features of an electrical isolator for a capacitive device, according to one embodiment.

FIG. 4a, FIG. 4b, FIG. 4c, FIG. 4d, and FIG. 4e are schematics of features of a capacitive device according to some embodiments of the invention.

FIG. 7a and FIG. 7b are illustrations of features of an electrical isolator for a capacitive device, according to one embodiment.

FIG. 8 is an illustration of a capacitive device according to one embodiment of the invention.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Figure 1:
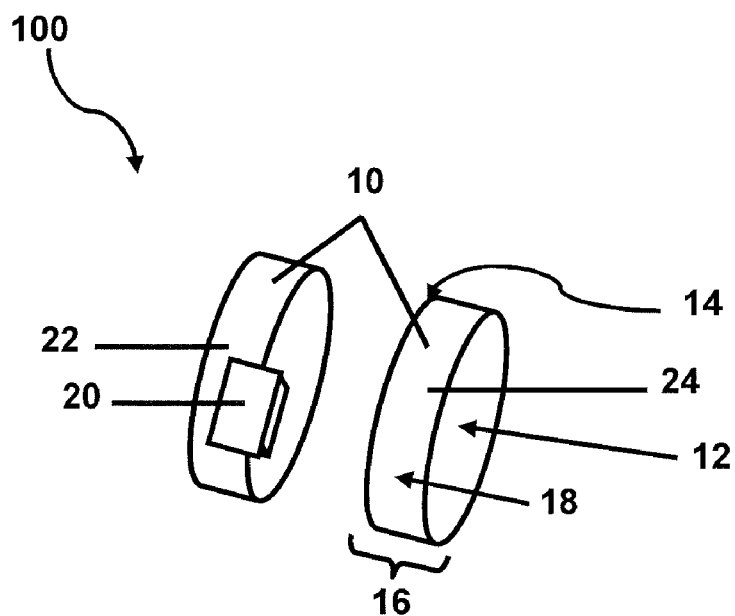
FIG. 1 is an exploded view schematic of features of a capacitive device according to one embodiment of the invention.

Features 100 of a capacitive device, according to one embodiment of the invention, are shown in FIG. 1. The capacitive device, in this embodiment, comprises two or more electrodes 10 arranged in series. Each electrode comprises a first face 12, an opposing second face 14 and a thickness 16 defined by an outer surface 18 extending from the first face to the opposing second face. An electrical isolator 20 comprising a compliant material is disposed between faces of adjacent electrodes 22 and 24 and covers at least a portion of the outer surface of the first electrode 22.

In a parallel plate capacitive device, electrodes are arranged in series such that at least a portion of the opposing second face of the first electrode and at least a portion of the first face of a second electrode are adjacent to each other.

In a flow-through capacitive device, electrodes are arranged in series from upstream to downstream such that at least a portion of a fluid conveyed through the first face of a first electrode is subsequently conveyed through at least a portion of the opposing second face of the first electrode and at least a portion of the fluid is subsequently conveyed through at least a portion of the first face of a downstream second electrode.

Figure 2:
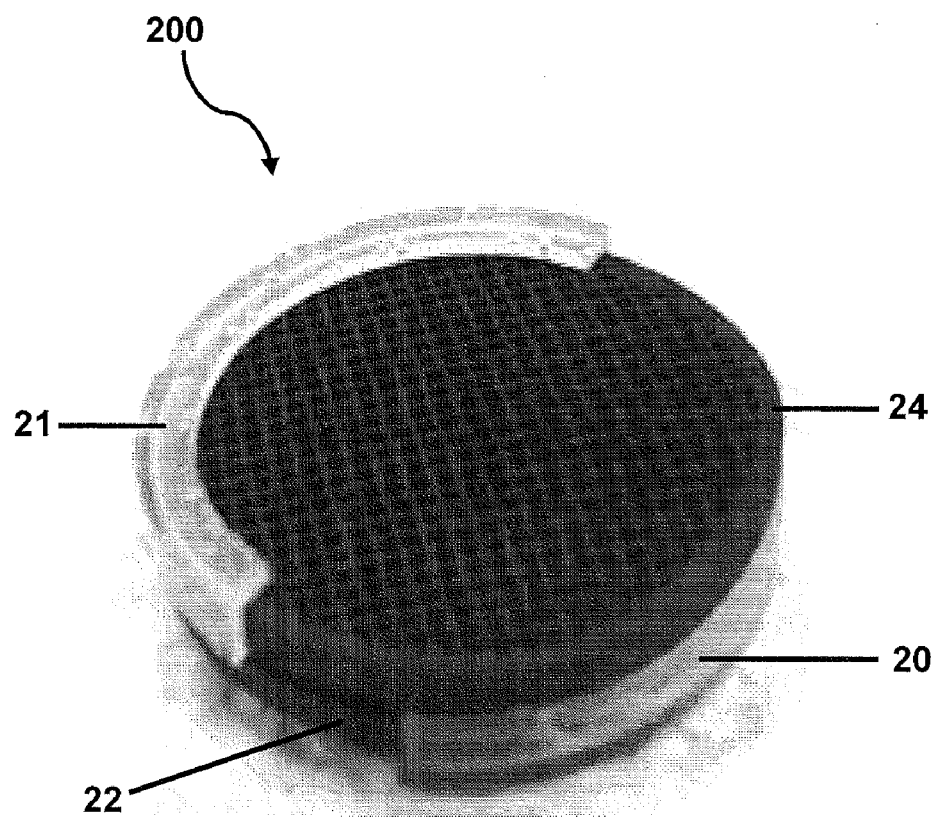
FIG. 2 is a photograph of features of a capacitive device according to one embodiment of the invention.
Figure 5A:
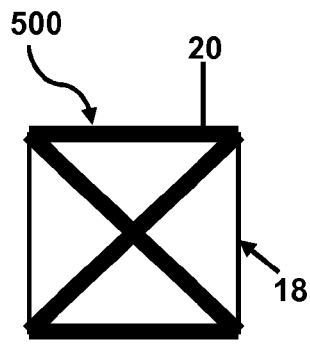
FIG. 5a, FIG. 5b, FIG. 5c, FIG. 5d, and FIG. 5e are schematics of features of a capacitive device according to some embodiments of the invention.
Figure 5B:
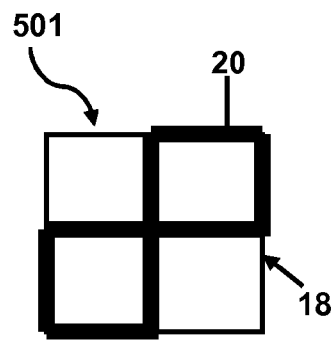
Figure 5C:
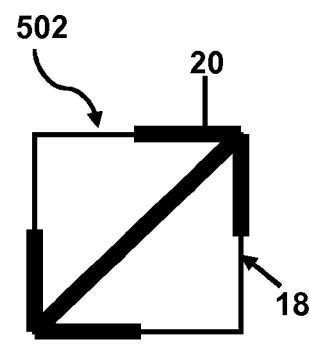
Figure 5D:
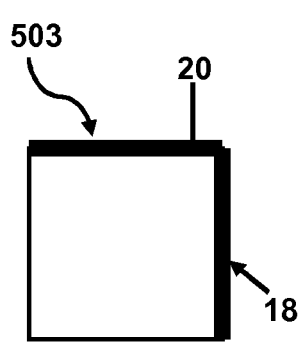
Figure 5E:
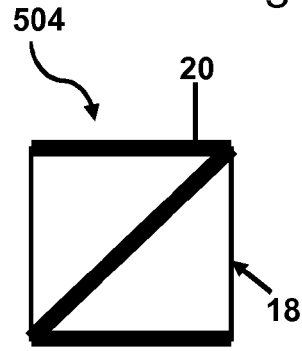

Features 200 of an electrical isolator for a capacitive device, according to one embodiment, are shown in FIG. 2. Shown in this embodiment, are two adjacent electrodes 22 and 24, each electrode having an electrical isolator 20 and 21 respectively.

Features 300 of an electrical isolator, according to another embodiment, are shown in FIG. 3. The electrical isolator 20 is disposed between the faces 12 and 14 of each pair of adjacent electrodes and covers a portion of the outer surface 18 of each electrode. This structure can provide mechanical support across the faces of the electrodes. This is advantageous as the diameter of the electrodes increase or as the thickness of the electrodes decrease.

Figure 6:
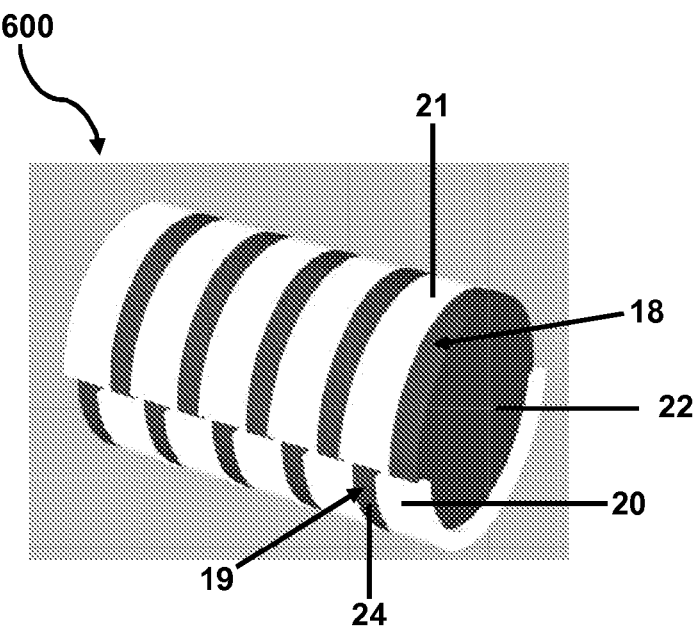
FIG. 6 is an illustration of features of a capacitive device, according to one embodiment of the invention.

Features 600 of an electrical isolator, according to another embodiment, are shown in FIG. 6. The electrical isolator 20, in this embodiment, covers a portion of the outer surface 18 of one electrode 22 in a position diametrically opposing the position of the electrical isolator 21 contacting the outer surface 19 of an adjacent electrode 24.

Features 400, 401, 402, 403, 404, 500, 501, 502, 503, 504, 700, and 701 of an electrical isolator, according to some embodiments, are shown in FIG. 4a, FIG. 4b, FIG. 4c, FIG. 4d, FIG. 4e, FIG. 5a, FIG. 5b, FIG. 5c, FIG. 5d, FIG. 5e, FIG. 7a, and FIG. 7b respectively. The electrical isolator 20 comprises a compliant material and, in some embodiments, covers from 10 percent to 90 percent, for example, from 25 percent to 75 percent of the perimeter of the outer surface 18 of the electrode on which it is disposed, as shown in FIG. 5a, FIG. 5b, FIG. 5c, FIG. 5d, and FIG. 5e.

In some embodiments, as shown in FIG. 4a, FIG. 4b, FIG. 4c, FIG. 4d, FIG. 4e, FIG. 7a (exploded view), and FIG. 7b, the outer surface 18 of the electrode is circular and the compliant material of the electrical isolator 20 covers from 45 degrees to 315 degrees of the circumference of the outer surface 18, for example, from 60 degrees to 180 degrees of the circumference of the outer surface.

The compliant material, according to one embodiment, is selected from a silicone, an elastomer, natural rubber, silicone rubber, butyl rubber, polybutadiene, nitrile rubber, polyurethane rubber, fluoroelastomers and combinations thereof. The electrical isolator can be made according to several methods, for example, by injection molding, machining or by other methods known in the art.

In some embodiments, the electrical isolator can be bonded to one or more of the electrodes in the linear stack, for example, molded to or adhesively attached to the outer surface and/or to either the first face or the second face of one or more of the electrodes. It is advantageous that the electrical isolator does not appreciably restrict fluid flow along the axis of the two or more adjacent electrodes in a flow-through capacitive device.

The capacitive device 800, according one embodiment, as shown in FIG. 8, further comprises a first current collector 28 insulated from the outer surface 18 of the first electrode 22 through contact with the electrical isolator 20, and in electrical contact with the outer surface 19 of another electrode 25 in the series.

The capacitive device, according to another embodiment, also shown in FIG. 8, further comprises a second current collector 29 in electrical contact with the outer surface 18 of the first electrode 22. In one embodiment, also shown in FIG. 8, the second current collector 29 is insulated from the second electrode 24 contacting the first current collector 28 through contact with the compliant material of the electrical isolator 21. In one embodiment, the first current collector and the second current collector are diametrically opposed.

According to one embodiment, the first current collector and the second current collector are, independently, a material selected from nickel, carbon, graphite, titanium, aluminum, nickel, copper, silver, gold, platinum and combinations thereof. The first current collector and the second current collector can be in the form of a compliant sheet or foil.

When the first current collector carries, for example, a positive charge and the second current collector carries, for example, a negative charge, these above-mentioned configurations can be used to form a capacitive device having a series of alternating anodes and cathodes.

In one embodiment, the electrode material is selected from a carbon, a carbon-based composite, a carbon-based laminate, a conductive metal oxide and combinations thereof. As shown in FIG. 7a (exploded view) and FIG. 7b, each of the electrodes 10 can comprise a plurality of inner channels 30 having surfaces defined by porous walls and extending through the electrode from the first face 12 to the second face 14, for example, each electrode can be in the form of a honeycomb monolith.

The electrodes can be any shape or size providing the electrode comprises a first face, an opposing second face and a thickness defined by an outer surface extending from the first face to the opposing second face. An electrode having flattened areas on the outer surface may facilitate improved electrical connections to a current collector also having a surface with flattened areas contacting the electrodes. The electrodes can be, for example, polygonal, circular, cylindrical, square, cubed, triangular, pentagonal, hexagonal or a combination thereof.

The present invention provides one or more of the following advantages: insulation of alternating electrodes arranged in series from a common current collector, for example, one current collector for positive electrodes and one current collector for negative electrodes; electrical isolation for electrodes in an interconnected, interdigitated stack of electrodes, for example, flow-through monolithic carbon electrodes; easier assembly, in part, due to the incorporation of an insulator function and a spacer function into a single piece; increased chemical inertness in a harsh electrochemical environment, for example, in CDI applications; and improved electrical performance. Further, since the electrical isolator comprises a compliant material, the electrical isolator provides increased mechanical integrity when compared to a rigid material.

What is claimed is:

1. A capacitive device comprising:
two or more electrodes arranged in series, wherein each electrode comprises a first face, an opposing second face and a thickness defined by an outer surface extending from the first face to the opposing second face; and
an electrical isolator comprising a compliant material disposed between faces of adjacent electrodes and covering at least a portion of the outer surface of the first electrode, wherein the outer surface of the electrode is circular and the compliant material covers from 45 degrees to 315 degrees of the circumference of the outer surface.

2. The capacitive device according to claim 1, wherein the compliant material further covers a portion of the outer surface of the second electrode.

3. The capacitive device according to claim 2, wherein the electrical isolator is disposed between the faces of each pair of adjacent electrodes and covers a portion of the outer surface of each electrode.

4. The capacitive device according to claim 3, wherein the electrical isolator covers a portion of the outer surface of one electrode in a position diametrically opposing the position of the electrical isolator contacting the outer surface of an adjacent electrode.

5. The capacitive device according to claim 1, further comprising a first current collector insulated from the outer surface of the first electrode through contact with the electrical isolator, and in electrical contact with the outer surface of another electrode in the series.

6. The capacitive device according to claim 5, further comprising a second current collector in electrical contact with the outer surface of the first electrode.

7. The capacitive device according to claim 6, wherein the second current collector is insulated from another electrode in the series contacting the first current collector through contact with the compliant material.

8. The capacitive device according to claim 1, wherein the electrode material is selected from a carbon, a carbon-based composite, a carbon-based laminate, a conductive metal oxide and combinations thereof.

9. The capacitive device according to claim 1, wherein each electrode is a flow-through electrode.

10. The capacitive device according to claim 9, wherein each electrode comprises a plurality of inner channels having surfaces defined by porous walls and extending through the electrode from the first face to the second face.

11. The capacitive device according to claim 10, wherein each electrode is a honeycomb monolith.

12. The capacitive device according to claim 1, wherein the compliant material covers from 10 percent to 90 percent of the perimeter of the outer surface of the electrode on which it is disposed.

13. The capacitive device according to claim 1, wherein the compliant material covers from 60 degrees to 180 degrees of the circumference of the outer surface.

14. The capacitive device according to claim 1, wherein the compliant material is selected from a silicone, an elastomer, natural rubber, silicone rubber, butyl rubber, polybutadiene, nitrile rubber, polyurethane rubber, fluoroelastomers and combinations thereof.

15. The capacitive device according to claim 1, wherein the electrical isolator is bonded to one or more of the electrodes.

* * * * *